United States Patent [19]

Yamashita

[11] Patent Number: 5,022,300

[45] Date of Patent: Jun. 11, 1991

[54] JIG FOR USE WITH PUNCH PRESS

[75] Inventor: Miyuki Yamashita, Tokyo, Japan

[73] Assignee: Hirakawa Kogyosha Co., Ltd, Tokyo, Japan

[21] Appl. No.: 434,033

[22] Filed: Nov. 9, 1989

[30] Foreign Application Priority Data

Nov. 10, 1988 [JP] Japan ............................ 63-284344

[51] Int. Cl.[5] ........................ B23Q 1/00; B26D 5/00

[52] U.S. Cl. .................................... 83/743; 83/451; 83/467.1; 269/47

[58] Field of Search ..................... 269/47, 52; 83/451, 83/467.1, 743, 745

[56] References Cited

U.S. PATENT DOCUMENTS

| | | | |
|---|---|---|---|
| 1,467,971 | 9/1923 | Wyman | 269/47 |
| 1,938,375 | 12/1933 | Coffee | 269/47 |
| 2,346,719 | 4/1944 | Aske | 83/451 |
| 3,322,014 | 5/1967 | Boragina et al. | 83/451 |
| 3,524,372 | 8/1970 | Albrecht | 83/451 |
| 3,927,586 | 12/1975 | Griswold et al. | 83/451 |
| 4,018,414 | 4/1977 | Rote | 269/47 |

*Primary Examiner*—Frank T. Yost
*Assistant Examiner*—Scott A. Smith
*Attorney, Agent, or Firm*—Oblon, Spivak, McClelland, Maier & Neustadt

[57] ABSTRACT

A jig for positioning a press plate is used with a punch press which perforates the press plate to define reference holes or recesses that will be used to position the press plate in a printing press. While pins of the jig are being fitted in respective reference holes or recesses defined in advance in the press plate, reference end surfaces of the jig are held against a reference surface of the punch press to position the press plate in a first direction in which the press plate is inserted into the press plate. Then, other pins of the jig are fitted in a groove of the punch press to position the punch press in a second direction that is normal to the first direction. With the press plate being thus positioned, it is perforated by the punch press. Holes or recesses thus formed in the press plate have a certain positional relation to the reference holes or recesses already defined in the press plate, and will be used as a positioning reference when the press plate is set on the printing plate.

4 Claims, 4 Drawing Sheets

JIG FOR USE WITH PUNCH PRESS

BACKGROUND OF THE INVENTION

The present invention relates to a jig for positioning a press plate to be perforated by a punch press.

Heretofore, a photosensitive medium to be used in the printing industry is formed in advance with positioning holes or recesses which are of a shape suitable for a printing press, and then is set in a process camera with the holes or recesses being used as a positioning reference. Then, an image is photographed on the photosensitive medium. If the photosensitive medium is a direct press plate, then the image photographed thereon is developed and the photosensitive medium is completed as a press plate. If the photosensitive medium is not a direct press plate, then page make-up is done with the holes or recesses being used as a positioning reference, and a press plate is produced from the photosensitive medium by close contact exposure in a printer. Then, the press plate is set in the printing press while using the holes or recesses as a positioning reference. In this manner, a printed document of good finishing accuracy can be produced by the printing press in either a monochromatic printing mode or a multicolor printing mode which is free of color misalignment.

There have been used in the art process cameras which are capable of successively photographing multiple-page copy images on one photosensitive medium. One example of such process camera is disclosed in Japanese patent application No. 63-122543. According to the disclosed process camera, reference holes or recesses are formed in a press plate with reference to the positions of photographed images with in the process camera. However, the reference holes or recesses thus formed in the process camera may not necessarily be of a shape and position suitable for a printing press that will be employed in the printing process. Therefore, the press plate may not be set in the printing press while using the reference holes or recesses as a positioning reference. Since the reference holes or recesses are formed with reference to the positions of the photographed images, however, it should be possible to define holes or recesses matching the printing press to be used, by using the reference holes or recesses as a positioning reference.

SUMMARY OF THE INVENTION

It is an object of the present invention to provide a jig for positioning a press plate so that a punch press can easily and accurately form reference holes or recesses matching a printing press in the press plate based on reference holes or recesses that have been formed in the press plate with reference to the positions of images which have been photographed on the press plate in a process camera.

According to the present invention, there is provided a jig for use with a punch press for perforating a press plate which has been formed with at least one reference opening within a process camera with reference to the position of an image photographed on the press plate,. the jig comprising a pin for fitting engagement with the reference opening in the press plate, a reference end surface for being held against a reference surface of the punch press to position the press plate in a first direction in which the press plate is inserted into the punch press, while the pin is being fitted in the reference opening, and positioning means for interfitting engagement with positioning means of the punch press to position the press plate in a second direction normal to the first direction.

The pin of the jig is being fitted in the reference opening defined in advance in the press plate, and the reference end surface of the jig is held against the reference surface of the punch press to position the press plate in the first direction. Then, the positioning means of the jig is fitted in the positioning means of the press plate to position the punch press in the second direction which is normal to the first direction. Therefore, a reference hole or recess which matches a printing press to used can easily and accurately be defined in the press plate by the punch press.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 2:
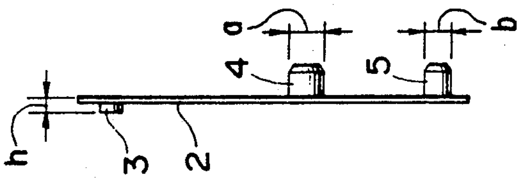
FIG. 2 is a side elevational view of the jig.
Figure 1:
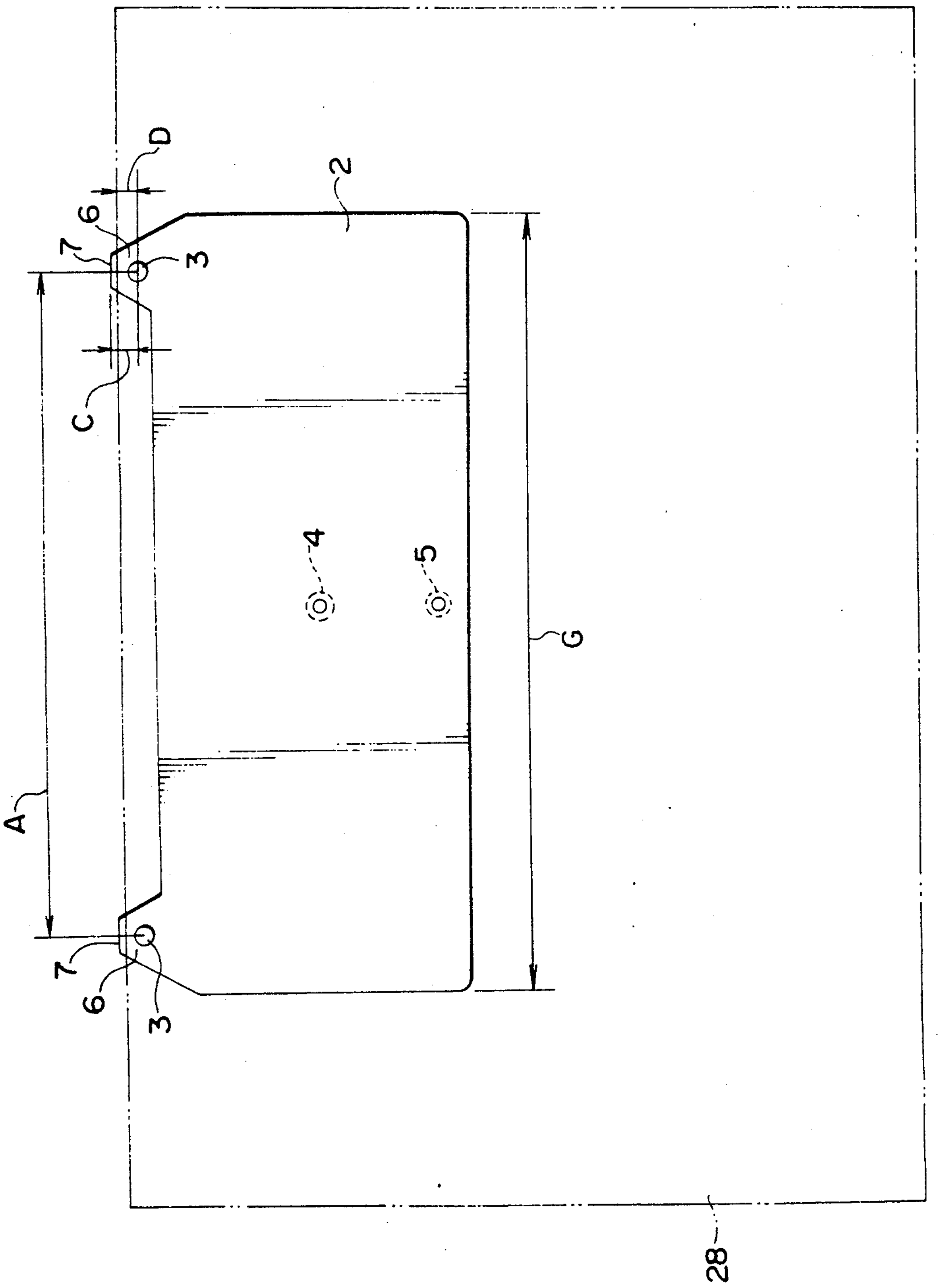
FIG. 1 is a plan view of a jig according to the present invention.

As shown in FIGS. 1 and 2, a jig 2 according to the present invention is basically in the form of a flat plate and has a pair of ear-like projections 6 on a side edge thereof with pins 3 fixed to one side surface of the projections 6. The pins 3 will be fitted in reference holes or recesses which have been defined in a press plate 28 within a process camera (not shown) with reference to the positions of photographed images. The pins 3 are spaced apart from each other by a distance which is equal to the distance between the reference holes or recesses referred to above. Each of the projections 6 has a distal end 7 providing a reference end surface that will be held against a reference surface of a punch press (described later on) for positioning the jig 2 inserted in the punch press. When the pins 3 are fitted respectively in the reference holes or recesses in the press plate 28, the distance C from the center of each pin 3 to the corresponding reference end surface 7 is larger than the distance D from the edge of the press plate 28 near the reference holes or recesses to the center of the pin 3. Therefore, the reference end surfaces 7 project outwardly beyond the edge of the press plate 28.

Two pins 4, 5 are also fixed to the jig 2 on its surface opposite to the surface thereof to which the pins 3 are secured. The pins 4, 5 are positioned such that a straight line passing through the centers of the pins 4, 5 extend perpendicularly to the straight line interconnecting the centers of the pins 3 and divide this straight line into two equal line segments. The pin 4 has a diameter a and the pin 5 has a diameter b smaller than the diameter a. It is assumed that the jig 2 has a longitudinal dimension or length G, and the dimension including the thickness of the jig 2 and the axial length of each of the pins 3 is indicated by h.

Figure 3:
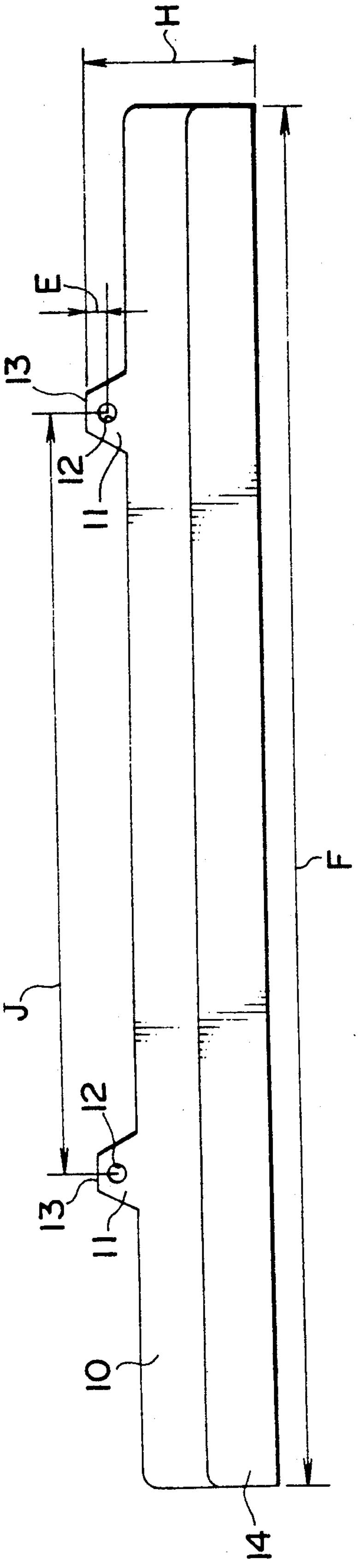
FIG. 3 is a plan view of a presser plate for use in combination with the jig.
Figure 4:
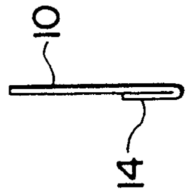
FIG. 4 is a side elevational view of the presser plate.

A presser plate which can easily be handled when used in combination with the jig 2 will be described with reference to FIGS. 3 and 4. The presser plate, designated at 10, comprises a flat plate having a length F which is substantially the same as the width of the press plate 28. The presser plate 10 is relatively thin as it will be used in superposed relation to the jig 2 and the presser plate 28, as described later on. However, the presser plate 10 has a lower folded-back edge portion 14 which makes the entire presser plate 10 relatively rigid. The presser plate 10 has a pair of ear-like projections 11 on an upper edge thereof. The projections 11 have respective holes 12 defined therein. The centers of the holes 12 are spaced from each other by a distance J which is equal to the distance A between the centers of the pins 3 on the jig 2. The holes 12 have a diameter substantially equal to the outside diameter of the pins 3. The distance by which the projections 11 project from the edge of the presser plate 10 is smaller than the distance by which the projections 6 project from the jig 2. More specifically, the distance or dimension E from the center of each of the holes 12 to the distal end surface 13 of the corresponding projection 11 is smaller than the distance or dimension C from the center of the pin 3 to the reference end surface 7. The presser plate 10 has an overall width H from the lower edge to the distal end surface 13, the width H being selected such that the presser plate 10 will not interfere with the images on the text of the press plate 28 when the presser plate 10 is placed on the press plate 28.

Figure 5:
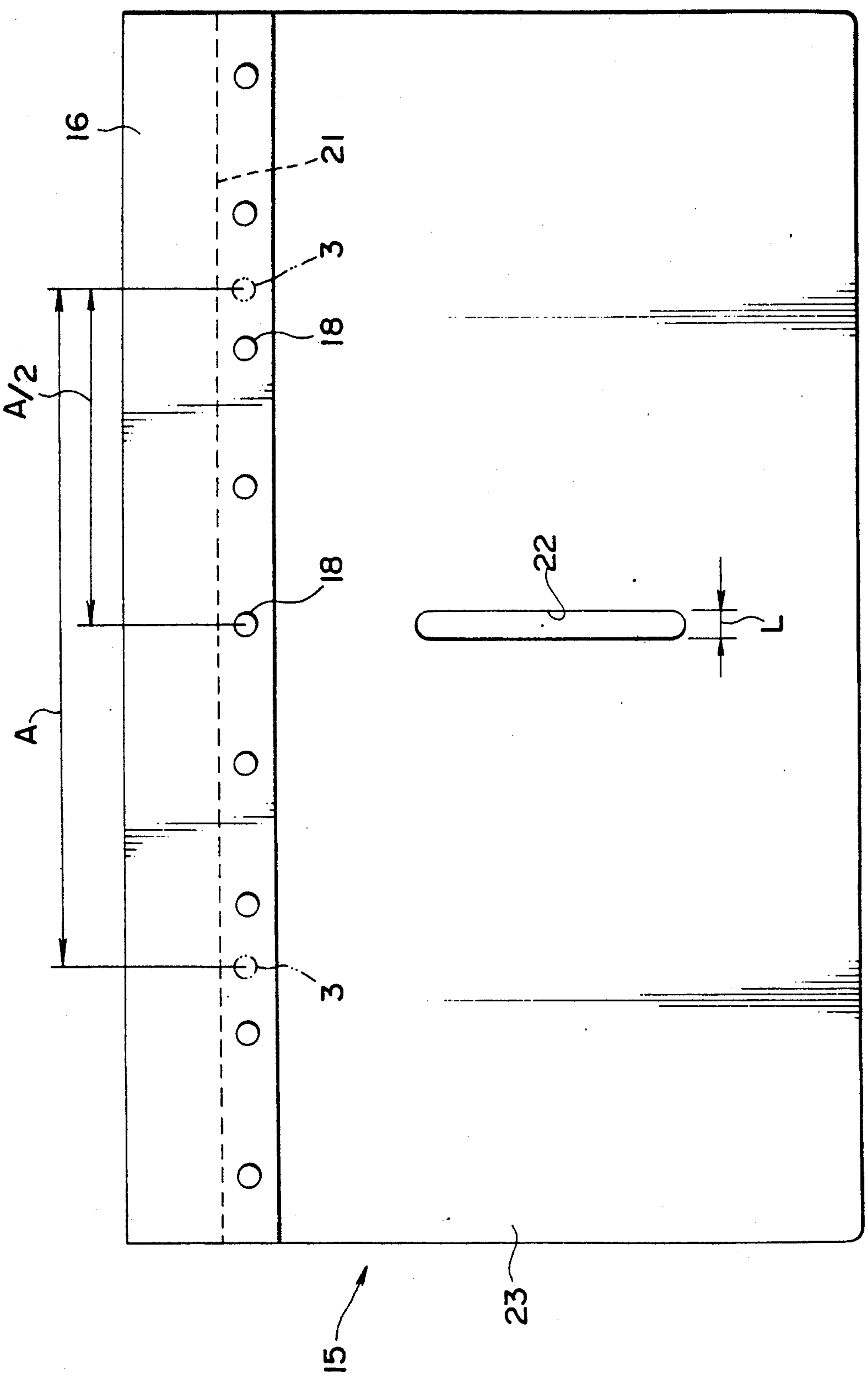
FIG. 5 is a plan view of a punch press for use in combination with the jig.
Figure 6:
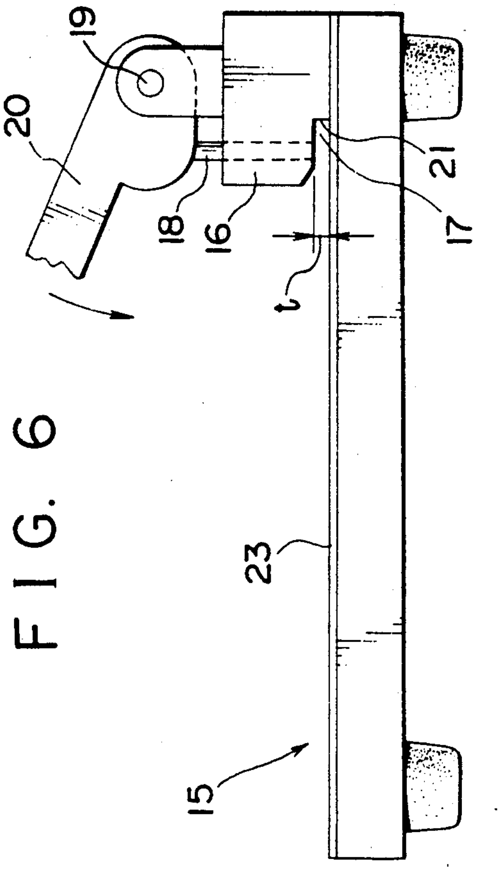
FIG. 6 is a fragmentary side elevational view of the punch press.

FIGS. 5 and 6 show a punch press to be used in combination with the jig 2. The punch press, generally denoted at 15, has a surface plate 23 and a punching block 16 fixed to one end of the surface plate 23. The punching block 16 projects in overhanging relation to the surface plate 23 with a space or gap 17 left between the overhanging punching block 16 and the surface plate 23, the space 17 having a height t. The height t of the space 17 is slightly larger than the height h shown in FIG. 2. The punching block 16 has a reference surface 21 at the inner end of the space 17 for engagement with the reference end surfaces 7 of the jig 2. A plurality of pin rods 18 for perforating the press plate 28 are vertically movably inserted in the overhanging block 16, the pin rods 18 being spaced at certain intervals. The pin rods 18 are normally urged by springs or the like to move upwardly. The pin rods 18 can be lowered against the spring forces to perforate the edge of the press plate 28 which has been inserted in the space 17, by lowering a lever 20 pivotally supported on the punching block 16 by a shaft 19 and operatively connected to the pin rods 18. The surface plate 23 has a groove 22 defined therein and extending in a direction normal to the straight line interconnecting the pin rods 18. The groove 22 serves as a means for positioning the jig 2 by receiving the pins 4, 5 therein. The groove 22 has a width L which is substantially the same as the diameter a of the pin 4.

The projections 6 of the jig 2 and the projections 11 of the presser plate 10 are positioned such that when the press plate 28 is set on the punch press 15 while being sandwiched between the jig 2 and the presser plate 10, the projections 6, 11 are displaced from holes or recesses that will be formed in the press plate 28 by the pin rods 18.

Figure 7:
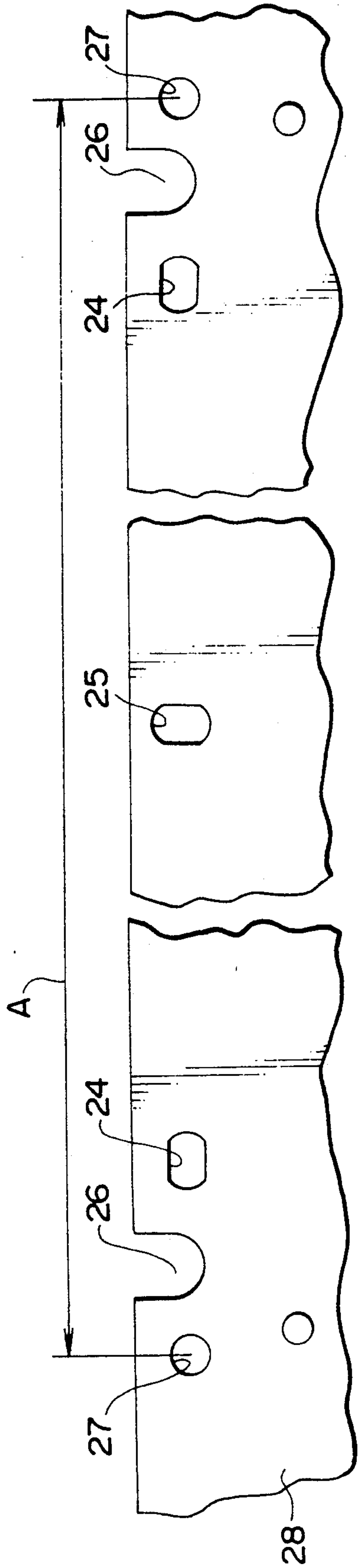
FIG. 7 is a fragmentary plan view showing by way of example holes and recesses which can be formed in a press plate by the jig and the punch press.

The jig 2 thus constructed will be used as follows:

As shown in FIG. 7, a pair of reference holes 27 is formed in an edge of the press plate 28 within a process camera (not shown) with reference to the positions of images photographed on the press plate 28. The pins 3 of the jig 2 (FIGS. 1 and 2) are fitted respectively in the reference holes 27. The pins 3 are inserted through the press plate 28 and project beyond the opposite surface of the press plate 28. The projecting pins 3 are also fitted respectively in the holes 12 of the presser plate 10 (FIGS. 3 and 4). The press plate 28 is thus sandwiched between the jig 2 and the presser plate 10. The edge of the press plate 28 which is sandwiched between the jig 2 and the presser plate 10 is inserted into the space 17 in the punch press 15. The reference end surfaces 7 of the jig 7 which project from the edge of the press plate 28 as shown in FIG. 1 are held against the reference surface 21 of the punch press 15, whereupon the inserted press plate 28 is positioned with respect to the direction in which the press plate 28 has been inserted into the space 17. The pins 4, 5 are fitted in the groove 22 in the surface plate 23 of the punch press 15, so that the press plate 28 is also positioned with respect to a direction normal to the direction in which it has been inserted. With the press plate 28 being thus positioned in two mutually perpendicular directions, the lever 20 is lowered to cause the pin rods 18 to define a number of reference holes or recesses in the press pate 28. The reference holes defined by the pin rods 18 may be horizontal oblong holes 24, vertical oblong holes 25, or circular holes (not shown). The reference recesses defined by the pin rods 18 may be shaped as indicated at 26 in FIG. 7. Whether reference holes or recesses or both are to be defined, and the shapes of these reference holes and recesses depend on a printing press on which the press plate 28 will be set.

With the embodiment described above, the pins 3 of the jig 2 are fitted respectively in the reference holes or recesses which have been defined in the press plate 28 within the process camera, the reference end surfaces 7 of the jig 2 are then held against the reference surface 21 of the punch press 15, so that the press plate 28 is positioned in the direction in which the press plate 28 is inserted in the space 17, and the pins 4, 5 of the jig 2 are fitted in the groove 22 of the punch press 15, so that the press plate 28 is positioned in the direction normal to the direction in which the press plate 28 is inserted. Therefore, reference holes or recesses which match the printing press on which the press plate 28 will be set can easily and accurately be defined in the press plate 28. When the presser plate 10 shown in FIGS. 3 and 4 are used in combination with the jig 2, the jig 2 can be prevented thereby from being detached from the press plate 28 due to its tendency to be coiled or wound back. Accordingly, the press plate 28 with the jig 2 securely held in contact therewith can be set on the punch press 15, with the result that the press plate 28 can efficiently be perforated. When the press plate 28 is inserted into or removed from the punch press 15, the jig 2 prevents external forces from being directly imposed on the press plate 28 and also prevents fingerprints or dirt from being applied to the press plate 28.

The diameter a of only the pin 4 is the same as the width L of the groove 22 of the punch press 22 and the diameter b of the pin 5 is smaller than the width L in order to allow the pins 4, 5 to be fitted easily into the groove 22. The diameters of the pins 4, 5 may be equal to each other, or the pin 5 may be dispensed with. Alternatively, the pins 4, 5 may be replaced with a ridge extending in the longitudinal direction of the groove 22 for fitting engagement therein.

Although a certain preferred embodiment has been shown and described, it should be understood that many changes and modifications may be made therein without departing from the scope of the appended claims.

I claim:

1. A jig for use with a punch press for perforating a press plate which has been formed with at least one reference opening within a process camera with reference to the position of an image photographed on the press plate, said jig comprising:

a pin for fitting engagement with the reference opening in the press plate;

a reference end surface for being held against a reference surface of the punch press to position the press plate in a first direction in which the press plate is inserted into the punch press, while said pin is being fitted in the reference opening; and positioning means for interfitting engagement with positioning means of the punch press to position the press plate in a second direction normal to said first direction.

2. A jig according to claim 1, further including a pair of ear-like projections projecting from a side edge of the jig, said pin being fixed to each of said ear-like projections.

3. A jig according to claim 1, further including a pair of ear-like projections projecting from a side edge of the jig, said reference end surface comprising a distal end surface of each of said ear-like projections.

4. A jig according to claim 1, wherein said positioning means comprises a pin insertable in a groove defined in the punch press.

* * * * *